US006975936B2

(12) United States Patent
Akuzawa et al.

(10) Patent No.: US 6,975,936 B2
(45) Date of Patent: Dec. 13, 2005

(54) MALFUNCTION DIAGNOSIS SYSTEM FOR ENGINE

(75) Inventors: Syu Akuzawa, Hamamatsu (JP); Hitoshi Motose, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/611,716

(22) Filed: Jul. 1, 2003

(65) Prior Publication Data
US 2004/0002810 A1    Jan. 1, 2004

(30) Foreign Application Priority Data
Jul. 1, 2002  (JP) ............... 2002-192105

(51) Int. Cl.[7] ............................................. G06F 19/00
(52) U.S. Cl. ................ 701/114; 701/115; 701/117; 440/89
(58) Field of Search ................ 701/114, 115, 110, 701/29, 33, 35, 117; 440/1, 89

(56) References Cited

U.S. PATENT DOCUMENTS

| | | | |
|---|---|---|---|
| 4,128,005 A * | 12/1978 | Arnston et al. ............. 701/114 |
| 4,497,057 A | 1/1985 | Kato et al. |
| 4,796,206 A | 1/1989 | Boscove et al. |
| 5,003,478 A * | 3/1991 | Kobayashi et al. .......... 701/32 |
| 5,034,894 A * | 7/1991 | Abe .............................. 701/99 |
| 5,245,324 A | 9/1993 | Jonker et al. |
| 5,325,082 A | 6/1994 | Rodriguez |
| 5,408,412 A * | 4/1995 | Hogg et al. .................. 701/33 |
| 5,852,789 A | 12/1998 | Trsar et al. |
| 5,935,187 A | 8/1999 | Trsar et al. |
| 6,055,468 A | 4/2000 | Kaman et al. |
| 6,112,150 A * | 8/2000 | Irons et al. ................. 701/114 |
| 6,141,608 A | 10/2000 | Rother |
| 6,155,896 A | 12/2000 | Suzuki |
| 6,508,232 B2 | 1/2003 | Sogawa |
| 6,516,265 B1 * | 2/2003 | Sommer et al. ............ 701/115 |
| 6,691,023 B2 * | 2/2004 | Fujino et al. ............... 701/114 |

FOREIGN PATENT DOCUMENTS

| | | | | |
|---|---|---|---|---|
| JP | 05-125955 | | 5/1993 | |
| JP | 9-329529 A | * | 12/1997 | ........ G01M 17/007 |
| JP | 2001-123918 | | 5/2001 | |
| JP | 2001-182603 | | 7/2001 | |
| JP | 2001-193542 | | 7/2001 | |

OTHER PUBLICATIONS

Co-pending U.S. Appl. No. 09/800,110, filed Mar. 6, 2001, entitled Diagnostic System for Engine, in the names of Kenichi Fujino, Hitoshi Motose, Masahiko Kato and Masayoshi Nanami, and assigned to Sanshin Kogyo Kabushiki Kaisha.

* cited by examiner

*Primary Examiner*—Hieu T. Vo
(74) *Attorney, Agent, or Firm*—Knobbe, Martens, Olson & Bear LLP

(57) ABSTRACT

A malfunction diagnosis system is provided to aid a technician or engineer in diagnosing an internal combustion engine. The diagnostic system comprises an electronic control unit that is operatively coupled to a data storage device and to one or more engine sensors. The electronic control unit is configured to collect data from the one or more engine sensors, compare the collected data with predetermined engine parameter values, and store the collected and compared data in the data storage device in various formats. A computer is selectively coupled to the data storage device. The computer program is configured to display specific sets of data and to clearly display any faulty engine parameter values resulting from the collected data comparison.

24 Claims, 17 Drawing Sheets

| Item | Value | Unit |
|---|---|---|
| Engine rotational speed | ------------ | rpm |
| Fuel pressure |  | MPa |
| Atmospheric pressure | ----------- | inlfg |
| Inlet air temperature | ---------- | °C |
| Ignition timing | ------------ | Degree |
| Battery voltage |  | V |
| Throttle opening | --------- | Degree |
| Fuel injection interval | --------- | ms |

*Figure 16*

| Maximum engine rotational speed | ••• | ••• hours |
|---|---|---|
| Minimum fuel pressure | ••• Mpa | ••• hours |
| Over-rev | ••• times ||
| Overheating | ••• times ||
|  |  ||
| Total operating time | ••• hours ||

*Figure 17*

MALFUNCTION DIAGNOSIS SYSTEM FOR ENGINE

PRIORITY INFORMATION

This application is based on and claims priority to Japanese Patent Application No. 2002-192105 filed Jul. 1, 2002, the entire contents of which is hereby expressly incorporated by reference.

BACKGROUND OF THE INVENTIONS

1. Field of the Invention

The present application relates to engine diagnostics and, in particular to an improved apparatus and method for clearly identifying and diagnosing various engine faults.

2. Related Art

Internal combustion engines are commonly used to power boats and other watercraft. For example, outboard motors typically include an internal combustion engine that is surrounded by a protective cowling. The internal combustion engine drives a propulsion device such as, for example, a propeller. Internal combustion engines are used to power personal watercraft and larger boats as well.

As with other types of engines, the diagnostic systems of marine engines indicate malfunctions through diagnostic codes, which are displayed through a pattern of lights. However, as the number of sensors in engines has increased, the diagnostic codes have become more complicated and difficult to understand. Moreover, as engines become more sophisticated and complicated, many engine technicians require additional assistance to diagnose engine malfunctions.

SUMMARY OF THE INVENTION

One aspect of at least one of the inventions disclosed herein includes the realization that diagnostic systems that record engine data can be improved by displaying information indicative of a fault in a manner so as to distinguish the data indicative of the fault from data that does not indicate a fault. For example, many known to diagnostic systems that record of data from sensors generated during operation of the engine can list the recorded data in a simple table form. However, when the data is displayed in this manner, additional effort is required for the repairperson to identify the data that is indicative of a fault.

Thus, in accordance with another aspect of at least one of the inventions disclosed herein, a method is provided for diagnosing a malfunction in an internal combustion engine including an electronic control unit and a memory storage device. The method comprises collecting operational data from one or more engine sensors connected to the electronic control unit, comparing the operational data with predetermined data, and determining if the operational data indicates a fault. The method also includes storing the operational data in the memory storage device, retrieving the operational data from the memory storage device with a computer that is operatively connected to the electronic control unit, and displaying a chosen set of operational data and out of range data on a display such that the data indicating a fault is distinguished from the operation data that does not indicate a fault.

In accordance with a further aspect of at least one of the inventions disclosed herein, a diagnostic system is provided for aiding a technician or engineer in diagnosing engine faults in a mechanism that comprises an engine. The diagnostic system comprises an electronic control unit operatively coupled to a data storage device and to one or more engine sensors. The electronic control unit is configured to collect operational data from the one or more engine sensors, compare the collected operational data with predetermined data to determine if the operational data indicates a fault, and to store the collected operational data and the data indicating a fault in the data storage device. The diagnosing system also includes an internal system within the electronic control unit with a computer processor operatively coupled to a memory, an interface device and an external system with a display. The internal system comprises a computer program stored in the memory and configured to retrieve operational data and the data indicating a fault from the data storage device. The computer program is further configured to display the operational data collected from the engine sensors and the data indicating a fault through the interface device on the display such that the data indicating a fault is distinguished from data that does not indicate a fault.

BRIEF DESCRIPTION OF THE DRAWINGS

These and other features of the invention will now be described with reference to the drawings of the preferred embodiments, which are intended to illustrate and not to limit the invention, and in which:

FIG. 16 is table of data that can be displayed on the display screen of FIG. 2;

FIG. 17 is another table of data that can be displayed on the display screen of FIG. 2;

DETAILED DESCRIPTION OF THE PREFERRED EMBODIMENTS OF THE INVENTIONS

With initial reference to FIG. 1, an outboard motor 10 with an engine diagnostic system having certain features, aspects and advantages of the inventions disclosed herein is described below. The engine diagnostic system is described in conjunction with an outboard motor to provide an environment in which the inventions may be employed. Although the present inventions have particular applicability to an outboard motor, it is anticipated that the engine diagnostic system can have utility in other environments of use. In particular, the present inventions may also find utility in applications where the engine is compact, used in remote locations, or both. Such applications might include, without limitation, engines in personal watercrafts, small jet boats, and off-road vehicles.

Figure 1:
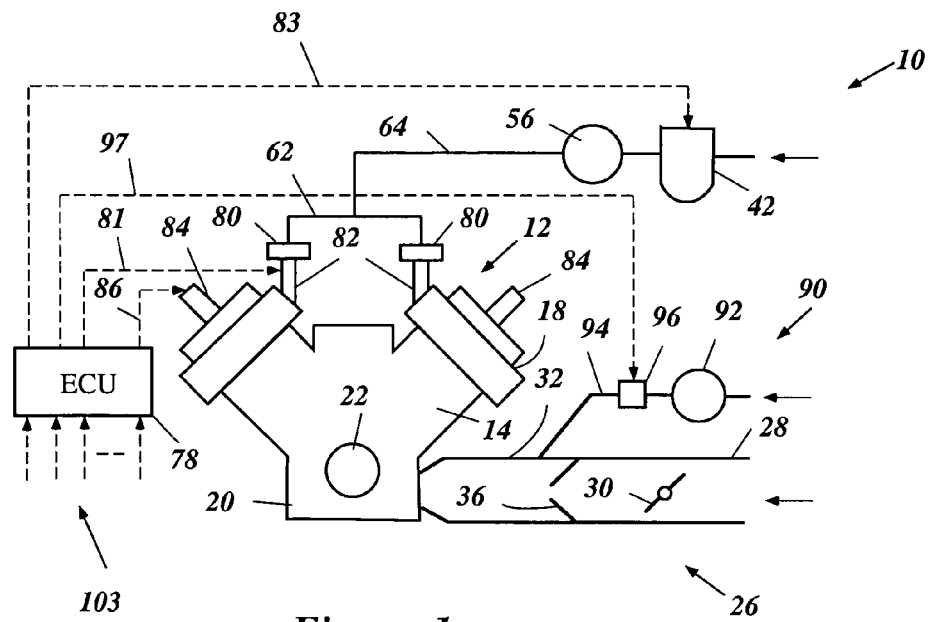
FIG. 1 is a partially schematic, top plan view of an outboard motor having certain features and advantages according to the present invention. The upper portion of this view schematically shows the fuel supply system of the outboard motor. Both the engine and the fuel supply system are connected to an ECU, which is depicted in the lower left hand portion of the view.

As shown in FIG. 1, the outboard motor 10 includes an engine 12. The illustrated engine 12 operates on a two cycle combustion principle.

The engine 12 has a cylinder block 14 that, in the illustrated embodiment, defines six cylinder bores (not shown). A corresponding number of pistons (not shown) are slidably supported in the cylinder bores for reciprocal movement.

The illustrated cylinder block 14 defines two cylinder banks, each of which has three cylinder bores. The cylinder banks are disposed at an angle to each other. As such, the illustrated engine 12 is a V6 type engine 12 (i.e., v-type, six cylinder). However, it should be appreciated that the features and advantages of the present inventions can be achieved utilizing an engine with different cylinder configurations (e.g., in-line, W, or opposed), a different number of cylinders (e.g., four) and/or a different principle of operation (e.g., four-cycle, rotary, or diesel principles).

A cylinder head assembly 18 is affixed to one end of the cylinder block 14 so as to close the cylinder bores. The cylinder head assembly 18, the cylinder bores and the pistons form the combustion chambers (not shown) of the engine 12. The other end of the cylinder block 14 is closed with a crankcase member 20, which defines a crankcase chamber (not shown).

A crankshaft 22 rotates in the crankcase chamber. The crankshaft 22 is connected to the pistons by connecting rods (not shown) and rotates with the reciprocal movement of the pistons. As is typical with two cycle crankcase compression engines, the portions of the crankcase chamber associated with each of the cylinder bores are sealed from each other.

The crankshaft 22 is also coupled to a driveshaft (not shown) that depends into and is journaled within a driveshaft housing lower unit assembly (not shown) of the outboard motor 10. As is typical in outboard motors, the engine 12 is arranged such that the crankshaft 22 and the drive shaft rotate about a vertically extending axis.

The driveshaft drives a propulsion device (not shown) such as, a propeller or jet pump, through a suitable transmission. The propulsion device is selectively driven in forward and reversed directions through a bevel gear reversing transmission (not shown). Since these components are well known in the art, further description of them is not necessary to permit those skilled in the art to practice the inventions disclosed herein.

An air induction system, which is indicated generally by the reference numeral 26, supplies an air charge to the crankcase chamber. The induction system 26 includes an air inlet device 28 that may include a silencer (not shown). The air inlet device 28 draws air from within a protective cowling (not shown) that surrounds and protects the engine 12. The protective cowling includes an inlet opening so that air can be drawn in from the surrounding atmosphere.

A throttle valve 30 is provided that communicates with the intake device 28. The throttle valve 30 is controlled in any suitable manner. Each intake manifold runner 32 is associated with a respective cylinder bore and communicates with intake ports (not shown) formed in the crankcase member 20.

A reed-type check valve 36 is provided in the manifold runner 32 upstream of the intake port (not shown). The reed-type check valves 36 permit an air charge to be drawn into the crankcase chamber when the respective piston is moving upwardly in their cylinder bores. As the respective piston moves downwardly, the charge in the crankcase chamber will be compressed and the respective reed type check valve 36 will close to preclude reverse flow.

As is well known in the art of two-cycle engines, each cylinder bore is provided with a scavenging system such as a Schnurl type scavenging system. Accordingly, the cylinder bore preferably includes a pair of side, main scavenge ports and a center, auxiliary scavenge port. Scavenge passages connect the crankcase chamber with each of the scavenge ports. As is well known in two cycle practice, the scavenge ports are opened and closed by the reciprocation of the pistons in the cylinder bores.

Preferably, the main scavenge ports are disposed on opposite sides of an exhaust port (not shown) which is diametrically opposite the center auxiliary scavenge port. The exhaust ports communicate with exhaust manifolds (not shown) that are formed integrally within the engine block 14.

The exhaust manifolds terminate in exhaust pipes (not shown) that depend into an expansion chamber (not shown) formed in the driveshaft housing and lower unit. The expansion chamber communicates with a suitable high speed underwater exhaust gas discharge and a low speed above-the-water exhaust gas discharge of any known type. The exhaust system employed forms no part of the present invention and therefore can be considered conventional.

The illustrated engine 12 includes a fuel injection system, which is illustrated schematically in the upper portion of FIG. 1. It should be appreciated, however, that several features and advantages of the present invention can be achieved in a carbureted engine, and in engines using types of fuel injection systems other than the type illustrated.

As is typical with outboard motor practice, the outboard motor 10 is supplied with fuel from a main fuel tank (not shown), which is normally mounted within the hull of the associated watercraft. A first low pressure pump 42 delivers fuel from the main fuel tank to a fuel filter (not shown) that is preferably mounted within the protective cowling of the outboard motor 10.

The fuel is delivered from the fuel filter to a vapor separator (not shown). It should be appreciated that the low pressure fuel pump 42 can be of the type that is operated by crankcase pressure variations. These types of pumps are well known in this art. The vapor separator includes is mounted at a suitable location within the protective cowling. A valve (not shown) is operated by a float (not shown) and maintains a level amount of fuel in the vapor separator.

A high pressure pump 56, which is preferably a positive displacement, engine driven pump, removes fuel from the vapor separator and delivers high pressure fuel to a main fuel manifold 62 through a conduit 64.

A fuel pressure sensor 76 is also connected to the main fuel manifold 62. The fuel pressure sensor 76 provides a fuel pressure signal to an Electronic Control Unit ("ECU") 78. The ECU 78 controls the engine systems and aids engine diagnostics, as is described in more detail below.

The main fuel manifold 62 supplies fuel to a pair of fuel rails 80, which are each associated with one of the cylinder banks. The fuel rails 80 supply fuel in a known manner to fuel injectors 82, which are mounted in the cylinder head assemblies 18. Preferably, the fuel injectors 82 are mounted above the exhaust ports on the exhaust side of the engine 12. The injectors 82 spray fuel downwardly toward the heads of the pistons.

The fuel injectors 82 are preferably of the solenoid operated type and have a solenoid valve which, when opened, controls the discharge of fuel into the combustion chambers. The ECU 78 controls the opening and closing of the solenoid valves via a control line 81. The ECU 87 also controls the electronic pump 42 through control line 83.

As is well known in the art, spark plugs 84 are mounted in the cylinder head assemblies 18 and have their spark gaps disposed in the cylinder bores. The ECU 78 through control line 86 fires the spark plugs 84.

In addition to controlling timing of firing of the spark plugs 84 and initiation and duration of fuel injection by the fuel injectors 82, the ECU 78 preferably also controls a lubricating system 90. The lubricating system 90 includes a lubrication reservoir (not shown).

To lubricate the engine 12, a lubrication pump 92 draws lubricant from the reservoir and sprays lubricant through a lubricant supply pipe 94 into the intake manifold runner 32. An electromagnetic solenoid valve 96, which is preferably controlled by the ECU 78, regulates the amount of lubricant that is supplied to the manifold runner 32. The ECU 78 controls the solenoid valve 96 through control line 97. Those of skill in the art will recognize that the outboard motor 10 can also include forms of direct lubrication for delivering lubricant directly to certain components of the engine.

The outboard motor 10 also includes various sensors that sense engine running conditions, ambient conditions, and/or conditions of the outboard motor 10. As is well known in the art, an engine control system can utilize maps and/or indices stored within memory 102 of the ECU 78 with reference to the data collected from these various sensors 103 to control the engine 10. As is explained in more detail below, various sensors can also be used to diagnose problems with the outboard motor.

Some of the sensors for engine control and engine diagnostics are shown schematically in FIG. 1 and are described below. It should be appreciated, however, that it is practicable to provide other sensors, such as, for example, but not limited to a crankcase pressure sensor, an engine height sensor, a trim angle sensor, a knock sensor, a neutral sensor, a watercraft pitch sensor, a shift position sensor, and an atmospheric temperature sensor that can be used in accordance with various control or the diagnostic strategies described below.

Figure 2:
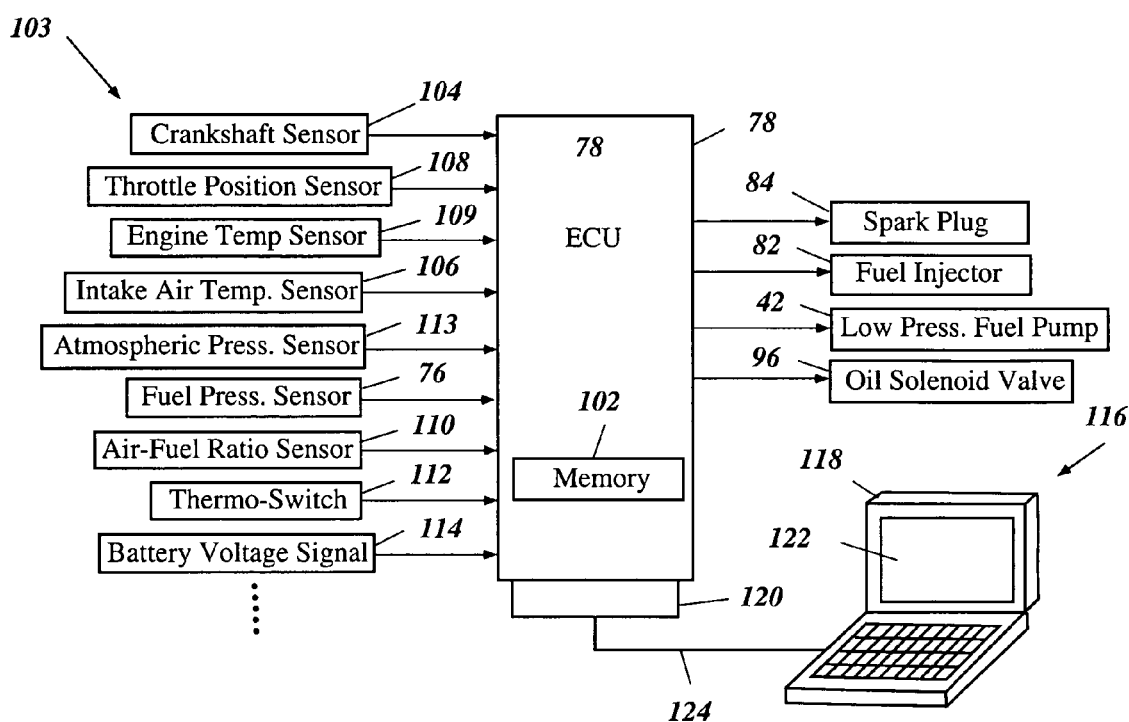
FIG. 2 is a schematic view of a diagnostic system that can be used with the outboard motor of FIG. 1. The diagnostic system includes the ECU of FIG. 1 and a computer with a display.

With reference to FIG. 2, a crankshaft angle sensor 104 defines a pulse generator that produces pulses as the crankshaft 22 rotates. The pulses are sent to the ECU and can indicate crankshaft angle and/or speed.

There is also provided an intake air temperature sensor 106 that senses the air temperature in the intake manifold 32, a throttle position sensor 108 that communicates with the throttle 30 and senses the position of the throttle valve 30, and an engine temperature sensor 109. A thermo-switch 112 provides a signal to the ECU 78 when the engine 12 reaches a predetermined temperature. This predetermined temperature can define a temperature when the engine begins to overheat.

An atmospheric pressure sensor 113 provides a signal to the ECU 78 to help determine the amount a fuel that can be injected to combine with the inducted air to form a proper air/fuel mixture. A battery voltage signal allows the ECU 78 to monitor and ensure a proper operating voltage to power all systems on the watercraft.

The outboard motor also preferably includes an air/fuel ratio sensor 110 that communicates with the combustion chambers or exhaust port of at least one of the combustion cylinders. Preferably, the air/fuel ratio sensor 110 utilizes an oxygen sensor (not shown); however, other types of sensors may be employed.

All the sensors mentioned above are connected to and communicate with the ECU 78 to provide accurate signals for proper operation as well as provide information to aid in proper diagnostics of the engine control system A diagnostic system 116 for the illustrated outboard motor 10 is described below. As shown in FIG. 2, the diagnostic system 116 includes the ECU 78 and a computer 118. The ECU 78, as described above, is connected to various engine sensors such as, for example, but not limited to thee air/fuel ratio sensor 110 and the crank angle sensor 104.

The diagnostic system also includes an adapter plug 120. Conversion adapters are well known in the art and are used to convert a signal from the ECU 110 into a form readable by the computer 112. For example, the adapter plug 120 can be used to convert a 12 Volt signal, which is common in outboard motors, to a 5 Volt signal. Although the illustrated conversion adapter is separated from the ECU 78 and the computer 118, it should be appreciated that it can also be integrated into the ECU 73 or the computer 118.

The computer 118 is preferably a personal computer with a CPU and supporting industry standard architecture. The computer includes a video display 122 for displaying data and an interface such as a keyboard for inputting data. The computer 118 is connected to the ECU 78 and the adapter plug 120 by a standard communication cable 124. The computer 118 can also preferably be connected to a second remote computer (not shown) to access data that has been retrieved and or stored on the computer 118.

The following description includes several control routines that are configured to collect and/or store data that is useful for engine diagnostics. It should be noted that the ECU 78, which performs these control routines, can be in the form of a hard wired feed back control circuit that performs the control routine described below. Alternatively, the ECU 78 can be constructed of a dedicated processor and a memory for storing a computer program configured to perform the steps described above. Additionally, the ECU 78 can be a general-purpose computer having a general-purpose processor and the memory for storing a computer program for performing the steps and functions described above.

Figure 3:
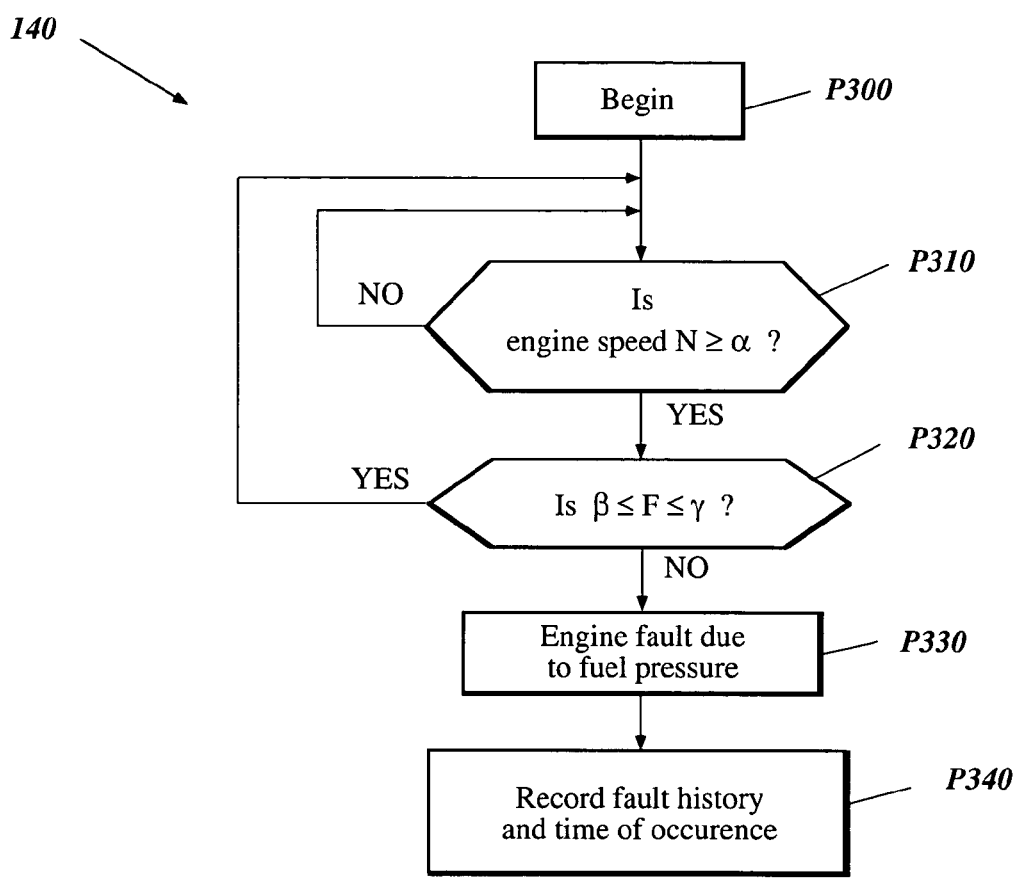
FIG. 3 is a flow diagram of a control routine that can be used be used with the ECU of FIG. 1 to determine a fuel pressure fault.

With reference to FIG. 3, a control routine 140 is illustrated that represents one operation that the diagnostic system 116 illustrated in FIG. 2 can be configured to perform. The control routine 140 begins in operation block P300 and advances to a decision block P310. In decision block P310 it is determined if the engine speed N is greater than or equal to a reference engine speed α. The reference engine speed α can be an engine speed equal to 2000 RPM (revolutions per minute).

If it is determined in decision block P310 that the engine speed N is not greater than or equal to α, the control routine 140 returns to decision block P310. If, however, if it is determined in a decision block P310 that the engine speed N is greater than or equal to α, the control routine 140 advances to a decision block P320.

In the decision block P320, it is determined if a fuel pressure F is greater than or equal to a predetermined minimum fuel pressure β and less than or equal to a predetermined maximum fuel pressure γ. The predetermined minimum fuel pressure β can represent fuel pressure equal to 5.5 MPa. The predetermined maximum fuel pressure γ can represent a fuel pressure of 8.5 MPa.

Another way the control routine 140 can also determine if the fuel pressure is out of range is to compare the actual fuel pressure value to a predetermined minimum fuel pressure value instead of a range of acceptable fuel pressure values. An example of the predetermined minimum fuel pressure value that can be used to compare against the actual fuel pressure value can equal 4 MPa.

If in decision block P320 it is determined that the fuel pressure F is greater than or equal to the predetermined minimum fuel pressure β and is less than or equal to the predetermined maximum fuel pressure γ, the control routine 140 returns to decision block P310. If, however, in decision block P320, it is determined that the fuel pressure F is not greater than or equal to the predetermined minimum fuel pressure β or not less than or equal to the predetermined maximum fuel pressure γ, the control routine 140 advances to an operation block P330.

In operation block P330, the control routine 140 determines that an engine fault has occurred due to an out of range fuel pressure value. The control routine advances to an operation block P340.

In operation block P340, the control routine 140 records the out of range fuel pressure fault along with the time when the out of range fuel pressure fault occurred. Optionally, the control routine 140 can be configured to determine and record the total amount of time that the fuel pressure is out of range fuel pressure. The out of range fuel pressure fault, the time of the fault occurrence, and optionally the total amount of time the out of range pressure existed, can be retrieved from the memory storage 102 through the diagnostic system 116, described in greater detail below.

Figure 4:
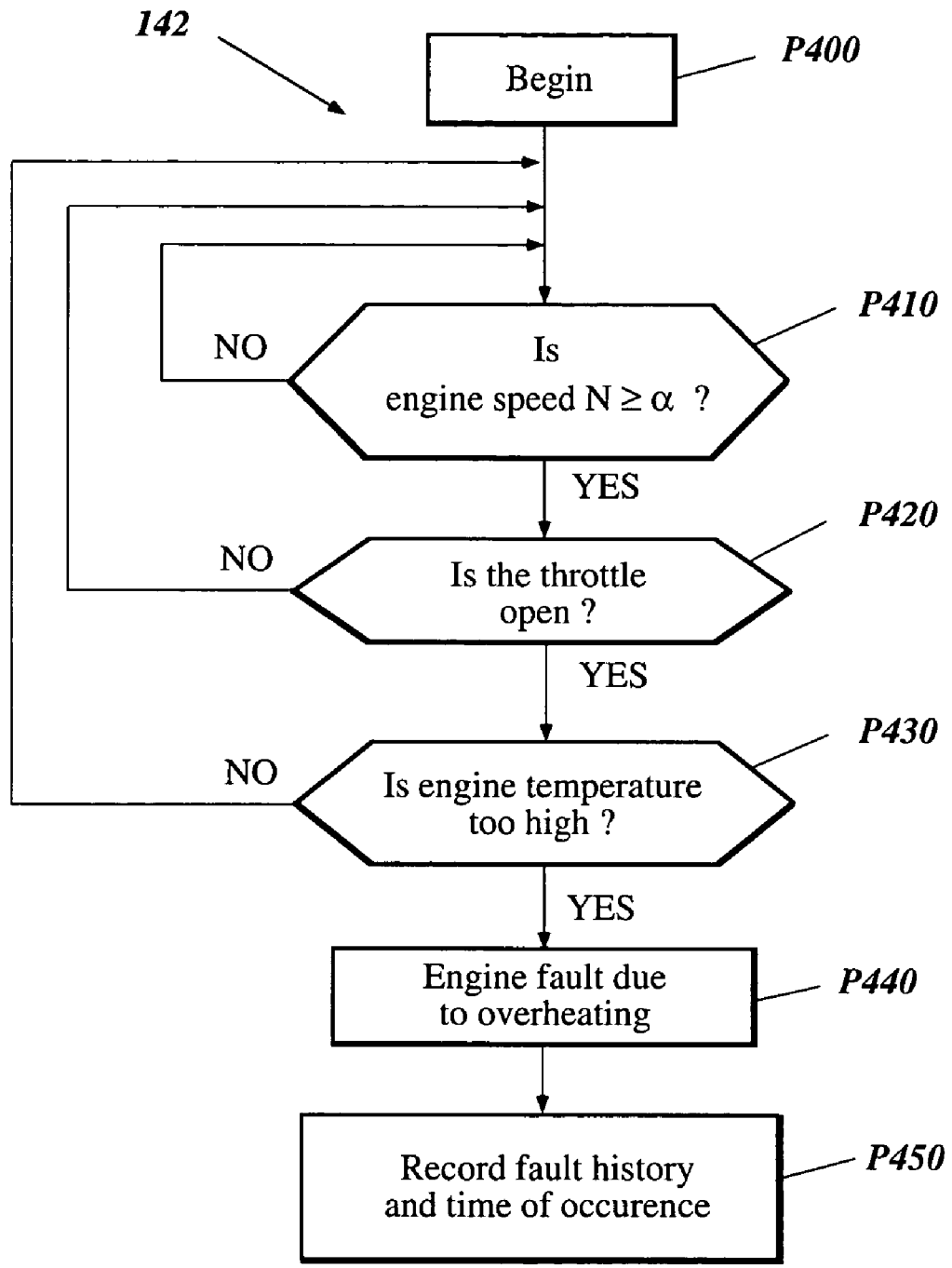
FIG. 4 is a flow diagram of a control routine that can be used with the ECU of FIG. 1 to determine if an engine temperature is too high.

FIG. 4 illustrates another flowchart that represents the operation of a control routine 142 that can be included in the diagnostic system 116 illustrated in FIG. 2. The control routine 142 illustrated in FIG. 4 begins with operation block P400 and advances to decision block P410.

In decision block P410, it is determined if the engine speed N is greater than or equal to an engine speed α. If in decision block P410 it is determined that the engine speed N is not greater than or equal to α, the control routine returns to the decision block P410. If, however, in decision block P410 it is determined that the engine speed N is greater than or equal to α, the control routine advances to decision block P420.

In decision block P420, it is determined if the throttle valve is open. The throttle valve can be considered open if the throttle valve position senses a minimum throttle angle of 10 degrees. If in decision block P420 it is determined that the throttle valve is not open, the control routine 142 returns to decision block P410. If, however, in decision block P420 it is determined that the throttle valve is open, the control routine advances to decision block P430.

In decision block P430, it is determined if the engine temperature is too high. If in decision block P430 it is determined that the engine temperature is not too high, the control routine 142 returns to decision block P410. If, however, in decision block P430 it is determined that the engine temperature is too high, the control routine advances to operation block P440.

In operation block P440, the control routine 142 establishes that an engine fault has occurred due to overheating. The control routine 142 then advances to operation block P450.

In operation block P450, the control routine 142 records the overheating fault along with the time when the overheating fault occurred. The overheating fault and the time of the fault occurrence can be retrieved from the memory storage 102 through the diagnostic system 116.

Figure 5:
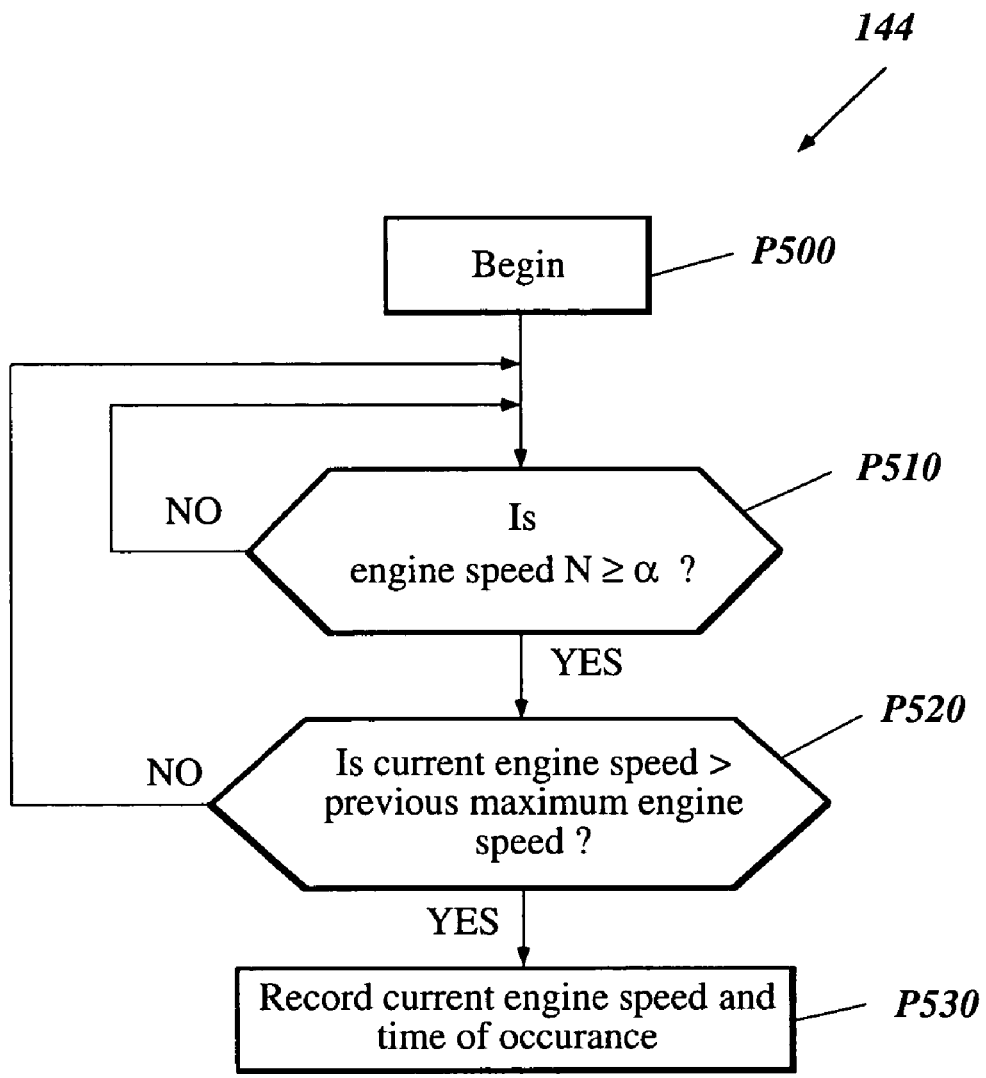
FIG. 5 is a flow diagram of a control routine that can be used with the ECU of FIG. 1 to determine a maximum engine speed.

FIG. 5 illustrates a flowchart that represents the operation of a control routine 144 of the diagnostic system 116. The control routine 144 illustrated in FIG. 5, begins with operation block P500. The control routine 144 then advances to decision block P510.

In decision block P510, it is determined if the engine speed N is greater than or equal to a predetermined engine speed α. If the engine speed N is not greater than or equal to the predetermined engine speed α, the control routine 144 returns to decision block P510. If, however, in decision block P510 it is determined that the engine speed N is greater than or equal to the predetermined engine speed α, the control routine 144 advances to decision block P520.

In decision block P520, it is determined if the current engine speed is greater than a previous maximum engine speed. The previous maximum engine speed can be the highest recorded previous engine speed. If in decision block P520, it is determined that the current engine speed is not greater than the previous maximum engine speed, the control routine 144 returns to decision block P510. If, however, in decision block P520 it is determined that the current engine speed is greater than the previous maximum engine speed, the control routine 144 advances to operation block P530.

In operation block P530, the control routine 144 records the current engine speed along with the time when the new higher engine speed occurred. The current highest engine speed and the time of the new high engine speed occurrence can be retrieved from the memory storage 102 through the diagnostic system 116.

Figure 6:
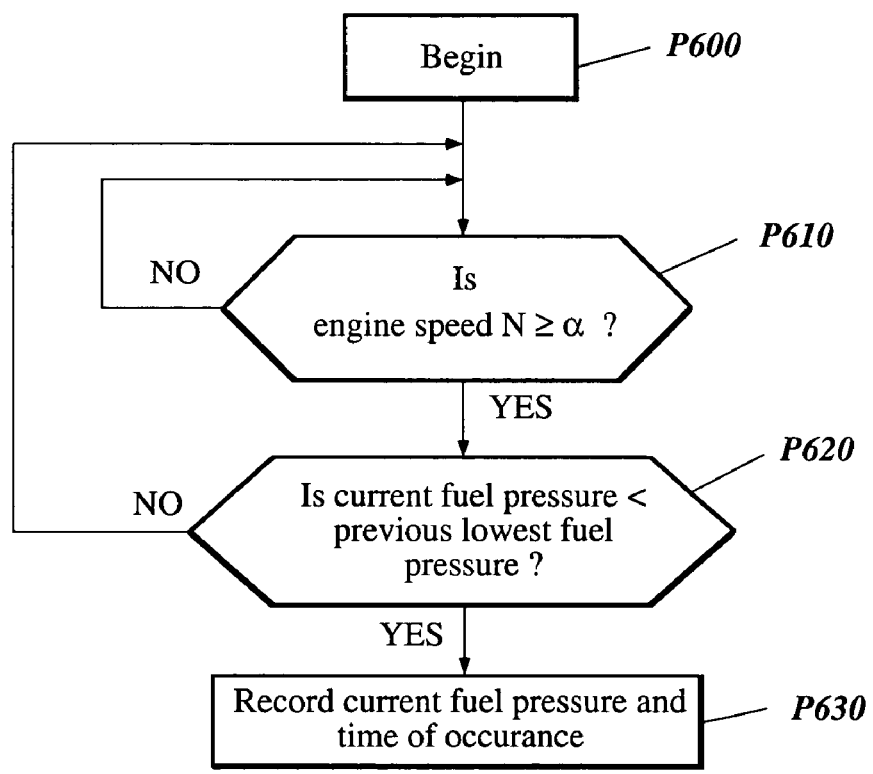
FIG. 6 is a flow diagram of a control routine that can be used with the ECU of FIG. 1 to determine a low fuel pressure condition.

FIG. 6 illustrates another flowchart that represents an operation that the diagnostic system 116 illustrated in FIG. 2 can be configured to perform. The flowchart 146 begins with operation block P600 and advances to decision block P610.

In decision block P610, it is determined if the engine speed N is greater than or equal to the predetermined engine speed α. In decision block P610, if the engine speed N is greater than or equal to the predetermined engine α, the control routine 146 returns to decision block P610. If, however, in decision block P610 it is determined that the engine speed N is not greater than or equal to the predetermined engine speed a, the control routine 146 advances to decision block P620.

In decision block P620, it is determined if the current fuel pressure is less than a previous lowest fuel pressure. If it is determined that the current fuel pressure is not less than the previous lowest fuel pressure value, the control routine 146 returns to P610. If, however, in decision block P620, it is determined that the current fuel pressure is less than the previous lowest fuel pressure value, the control routine 146 advances to operation block P630.

In operation block P630, the control routine records the current fuel pressure with the time when the new lowest fuel pressure occurred. The current fuel pressure and the time of the current fuel pressure occurrence can be retrieved from the memory storage 102 through the diagnostic system 116.

Figure 7:
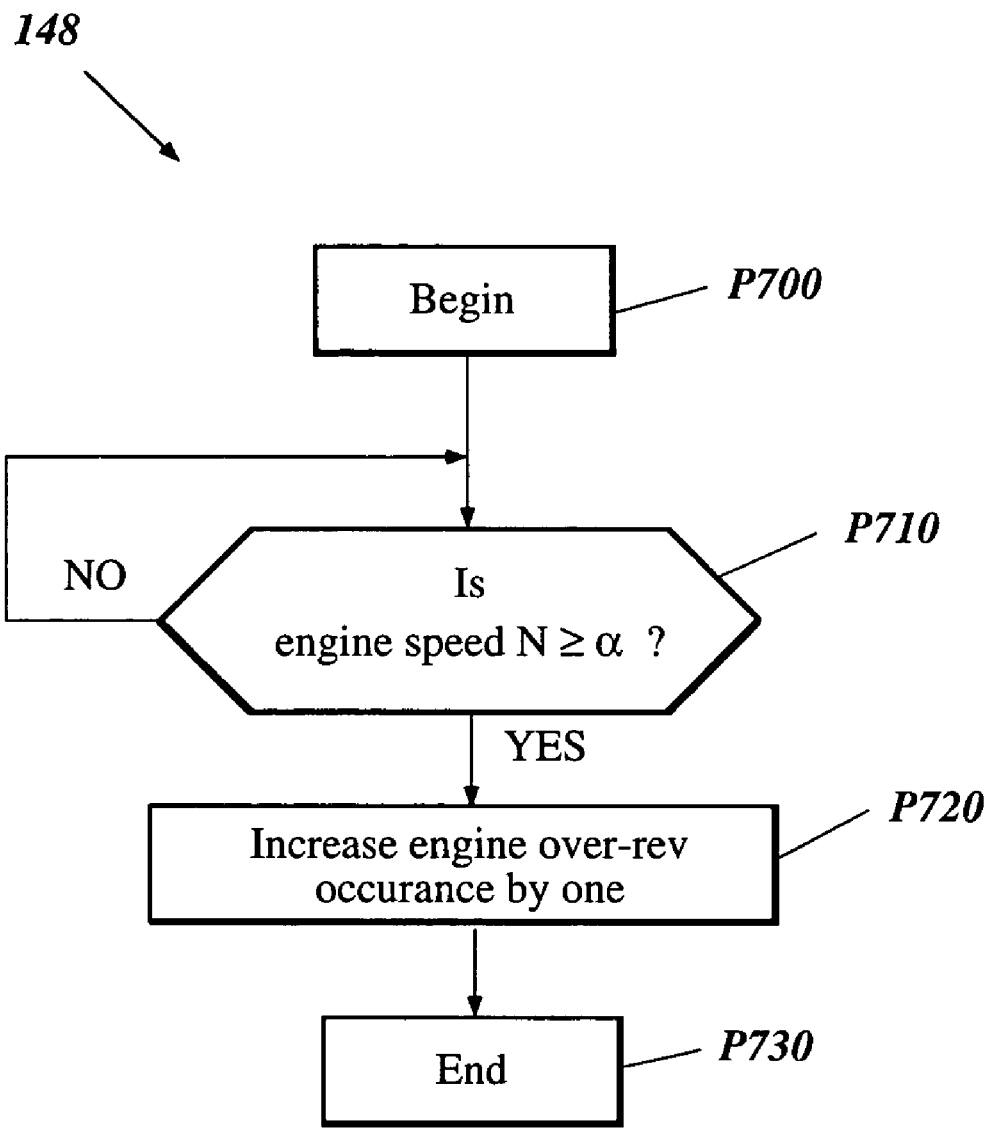
FIG. 7 is a flow diagram of a control routine that can be used with the ECU of FIG. 1 to determine an over-rev engine speed condition.

FIG. 7 illustrates another flowchart that represents an operation that the diagnostic system 116 illustrated in FIG. 2 can be configured to perform. The flowchart 148 illustrated in FIG. 7 begins with operation block P700 where a main switch (not shown) is turned on. The control routine 148 advances to a decision block P710.

In decision block P710, it is determined if the engine speed N is greater than or equal to the predetermined reference engine speed α. If in decision block P710 the engine speed N is not greater than or equal to the predetermined reference engine speed α, the control routine 148 returns to decision block P710. If, however, in decision block P710 it is determined that the engine speed N is greater than or equal to the predetermined reference engine speed α, the control routine advances to operation block P720.

In operation block P720, the control routine increases an over-rev counter by 1. The over-rev counter is a counter that keeps track of every engine over-rev occurrence. For example, every time an engine speed rises above a predetermined maximum engine speed, the over-rev counter is increased by one. The control routine 148 then advances to operation block P730 where the control routine ends and the main switch is turned off.

Figure 8:
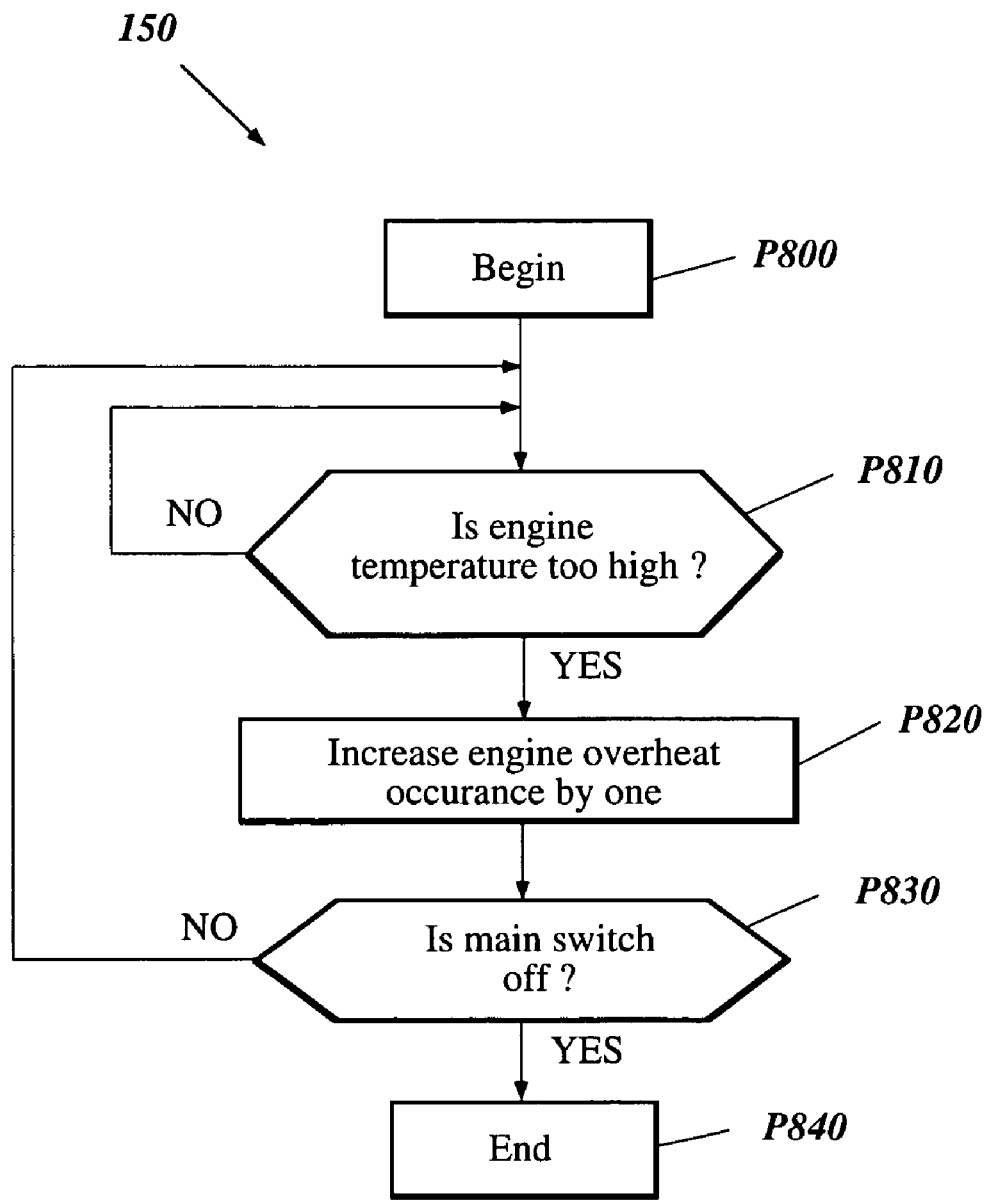
FIG. 8 is a flow diagram of a control routine that can be used with the ECU of FIG. 1 to determine an engine overheat condition.

FIG. 8 illustrates another flowchart that represents an operation that the diagnostic system 116 illustrated in FIG. 2 can be configured to perform. The control routine 150 in FIG. 8 begins with operation block P800 and advances to decision block P810.

In decision block P810, it is determined if the engine temperature is too high. If the engine temperature is not too high, the control routine 150 returns to decision block P810. If, however, in decision block P810 it is determined that the engine temperature is too high, the control routine advances to operation block P820.

In operation block P820, the control routine 150 increases an engine overheat counter by 1. For example, every time an engine temperature value rises above a predetermined engine temperature, the overheat counter is increased by one. The overheat counter is a counter that keeps track of every engine overheat occurrence. The control routine 150 then advances to decision block P830.

In decision block P830, it is determined if the main switch is off. If the main switch is not off, the control routine 150 returns to decision block P810. If, however, in decision block P830 the main switch is off, the control routine 150 advances an operation block P840 where the control routine 150 ends.

Figure 9:
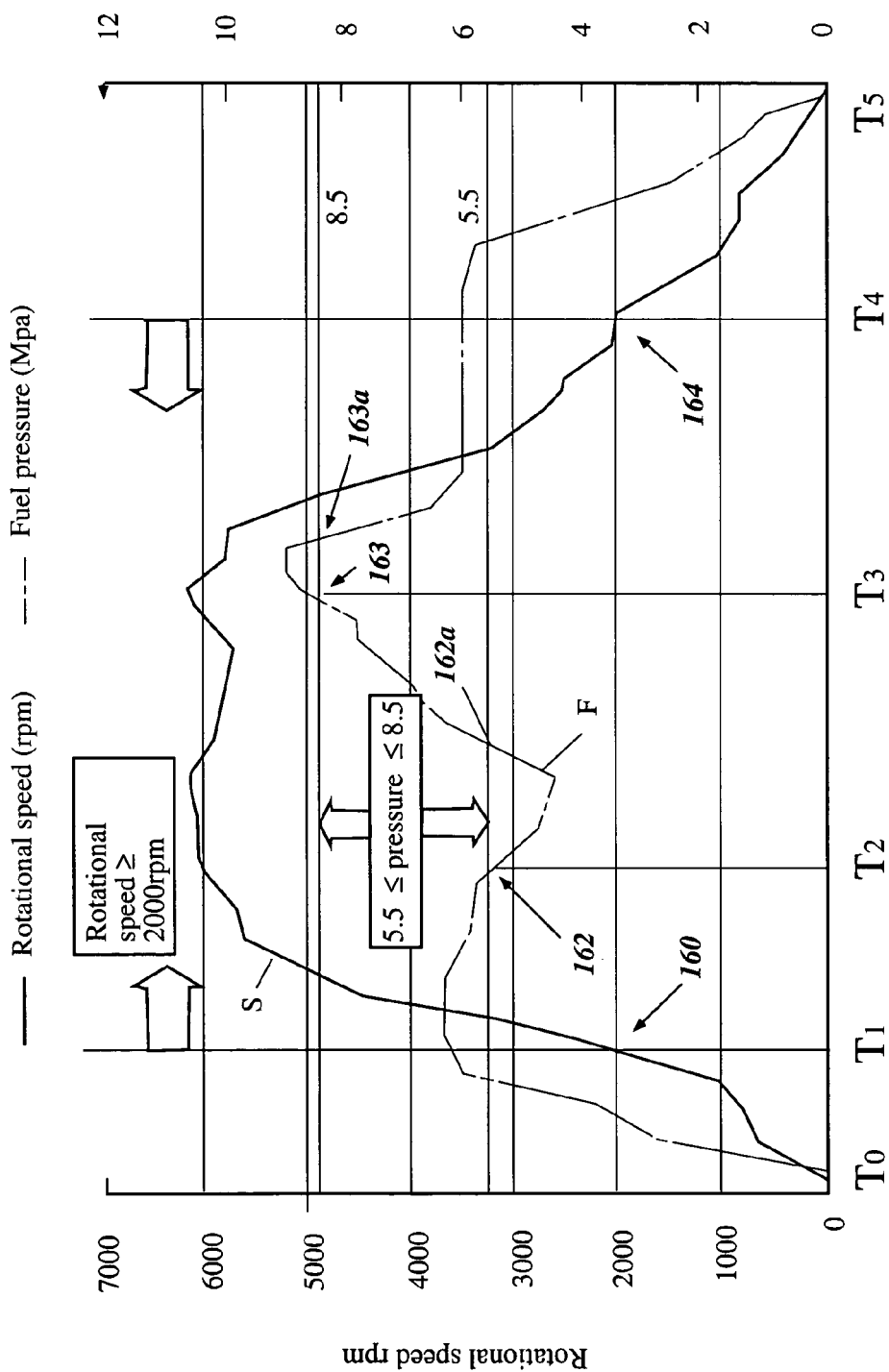
FIG. 9 is a graph illustrating how the ECU of FIG. 1 can diagnose a fuel pressure fault during operation of an engine.

FIG. 9 includes a graph illustrating engine speed and fuel pressure with reference to total operating time. The horizontal axis of the graph represents time. The vertical axis of the graph represents engine speed and fuel pressure, with engine speed labeled on the left vertical edge of the graph, and fuel pressure labeled on the right side edge of the graph.

The graph of FIG. 9 also includes two plots, a first plot "S" indicates engine speed and the second plot "F" indicates fuel pressure. The plots S, F illustrate the engine speed and fuel pressure during an exemplary operation of an engine, such as the engine 12, thereby illustrating an exemplary relationship between engine speed and fuel pressure. More particularly, as described in greater detail below, the graph of FIG. 9 reflects the engine speed and fuel pressure in an engine when the fuel pressure exceeds a predetermined normal range of operation.

The control routine 140 illustrated in FIG. 3, can be used to identify and record when the fuel pressure exceeds a predetermined range. For example, using the control routine 140, the fuel pressure would be monitored between a predetermined engine speed window defined by operating times T1 and T4.

According to the description set forth above with reference to the flow chart of FIG. 3, fuel pressure is monitored as soon as the engine speed reaches a predetermined value as illustrated by the reference point 160 of FIG. 9, which corresponds to the operating time T1 and decision block P310 (FIG. 3). In this example T1 and reference point 160 correspond to a predetermined engine speed of 2000 RPM. After the engine speed has reached a value of 2000 RPM, the diagnostic system 116 begins to monitor the fuel pressure F.

At a reference point 162 (FIG. 9), the fuel pressure drops below a predetermined low fuel pressure value of 5.5 MPa. When the fuel pressure drops below a predetermined reference point 5.5 MPa, the diagnostic system 116 detects the out-of-range fuel pressure (decision block P320 of FIG. 3), determines that the out of range fuel pressure is a fault (operation block P330), and records a fault (operation block P340).

The fuel pressure continues to drop and then rises to the predetermined minimum fuel pressure of 5.5 MPa, at point 162a. Optionally, as noted above with reference to FIG. 3, the control routine 140 can be configured to record the total time an out of range fuel pressure occurs. Thus, in the illustrative engine operation of FIG. 9, the total time recorded by the diagnostic system 116 is a time between that corresponding to point 162 and 162a.

In the illustrative engine operation shown in FIG. 9, the fuel pressure continues to rise from the point 162a to an upper predetermined fuel pressure value at reference point 163. In this particular example, the predetermined upper fuel pressure value is 8.5 MPa. Thus, with the control routine 140 continuing to operate, an out of range fuel pressure is detected at point 163, which corresponds to decision block P310 of FIG. 3. The diagnostic system 116 then determines that the out of range fuel pressure is a fault (operation block P330), and records a fault (operation block P340).

The fuel pressure continues to rise and then drops to the predetermined maximum fuel pressure of 8.5 MPa, at point 163a. Optionally, as noted above with reference to FIG. 3, the control routine 140 can be configured to record the total time an out of range fuel pressure occurs. Thus, in the illustrative engine operation of FIG. 9, the total time recorded by the diagnostic system 116 is a time between that corresponding to point 163 and 163a.

As noted above with reference to operation block P310 of the control routine 140, the diagnostic system 116 continues to monitor the fuel pressure until the engine speed drops below the predetermined engine speed 2000 RPM, represented by a reference point 164 at the operating time of T4 of FIG. 9.

Figure 10:
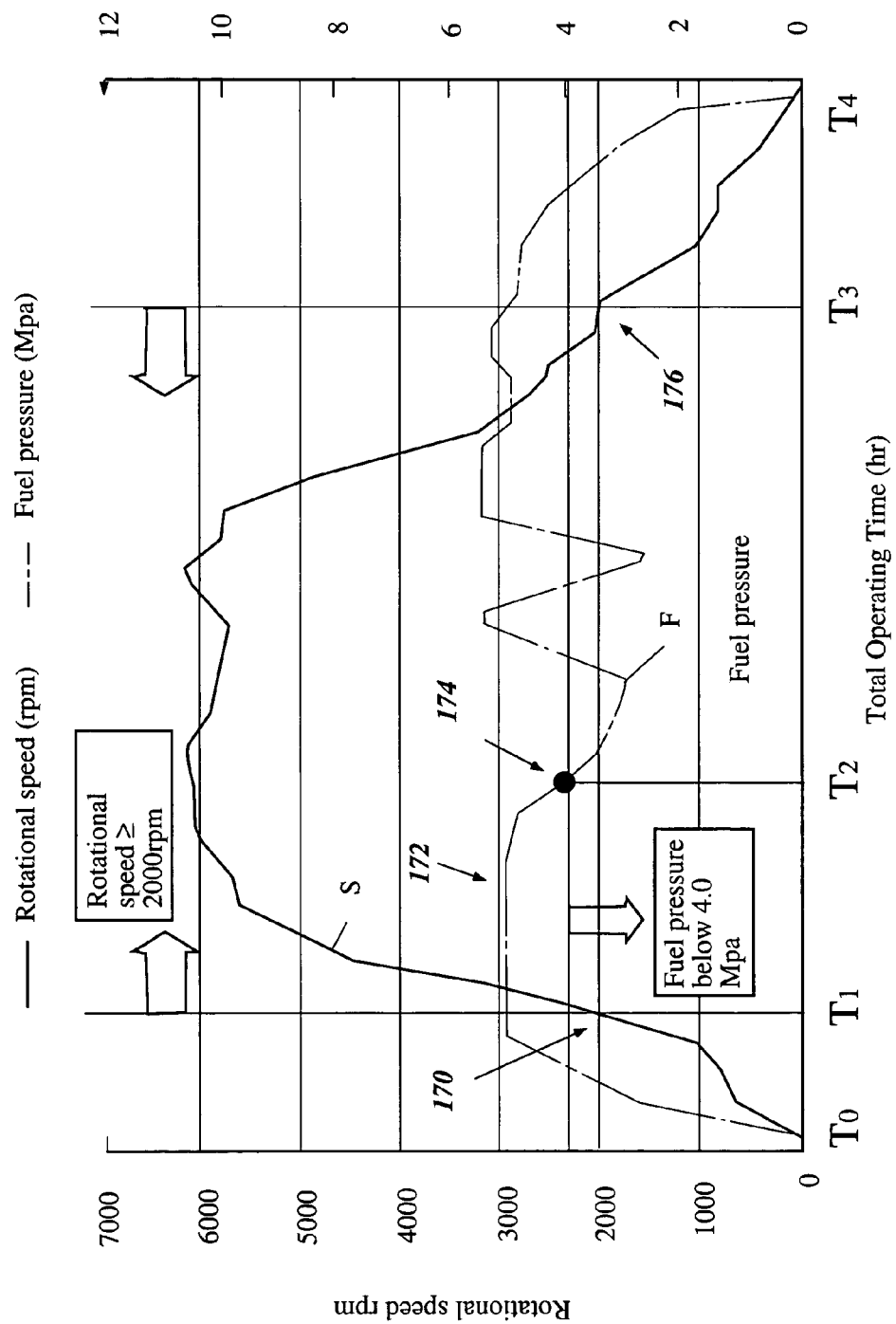
FIG. 10 is graph illustrating another example of how the ECU of FIG. 1 can diagnose a fuel pressure fault of an engine.

FIG. 10 illustrates another exemplary operation of an engine, such as the engine 12, during which the fuel pressure in the engine exceeds the predetermined range, the plot S representing engine speed and the plot F indicating fuel pressure. As the plots S, F of FIG. 10 illustrate, at a reference point 170, the engine speed has reached an engine speed value of 2000 RPM. Thus, at the reference point 170, the diagnostic system 116 begins monitoring the fuel pressure (decision block P310 of control routine 140).

As shown by the portion 172 of the fuel pressure plot F, the fuel pressure remains steady and then drops below a predetermined fuel pressure of 4 MPa at a reference point 174. 4 MPa is another example of minimum predetermined fuel pressure limit value. Other values other than 4 MPa can also be assigned as the predetermined fuel pressure limit value.

When the fuel pressure drops below this predetermined reference point of 4 MPa, the diagnostic system 116 detects the out of range fuel pressure (decision block P320 of FIG. 3), determines that the out of range fuel pressure is a fault (operation block P330), and records a fault (operation block P340). As noted above with reference to the graph of FIG. 9, the control routine 140 can be configured to record the total time an out of range fuel pressure occurs.

The diagnostic system stops monitoring the fuel pressure as soon as the engine speed drops below the predetermined engine speed of 2000 RPM which is illustrated by reference point 176 at a total operating time of T3.

Figure 11:
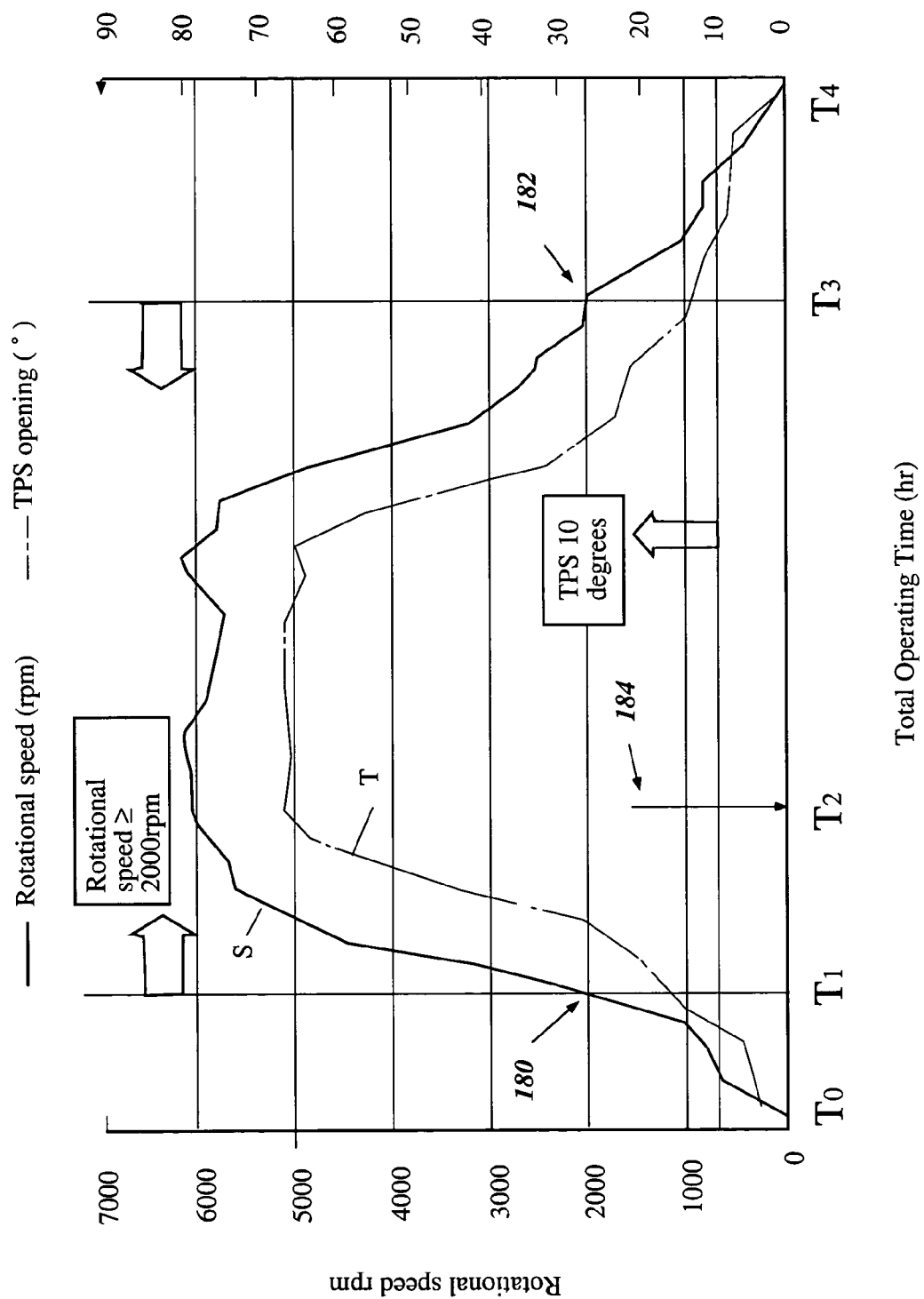
FIG. 11 is a graph illustrating how the ECU of FIG. 1 can diagnose an engine over-rev fault.

FIG. 11 includes a graph illustrating engine speed and throttle position with reference to total operating time. The horizontal axis of the graph represents time. The vertical axis of the graph represents engine speed and throttle position, with engine speed labeled on the left vertical edge of the graph, and throttle position labeled on the right side edge of the graph.

The graph of FIG. 11 also includes two plots, a first plot "S" indicates engine speed and the second plot "T" indicates Throttle position. The plots S, T illustrate the engine speed and throttle position during an exemplary operation of an engine, such as the engine 12, so as to provide exemplary reference information when an overheat of the engine is detected.

As noted above with reference to the control routine 142 of FIG. 4, the diagnostic system 116 can be configured to monitor engine temperature only if engine RPM is above 2000 RPM (decision block P410) and if the throttle position is greater than 10 degrees (decision block P420).

At a reference time T1, the engine speed S rises above a value of 2000 RPM illustrated by reference point 180. The diagnostic system 116 stops monitoring engine temperature when the engine speed S drops below the predetermined engine speed 2000 RPM as illustrated by reference point 182 at time T3.

Within this reference window, between operating time T1 and operating time T3, the engine speed S is above the reference engine speed 2000 so the diagnostic system 116 monitors the position of the throttle valve T. Throughout the window defined between T1 and T3, the throttle position T is above the predetermined throttle position of 10 degrees.

The reference number 184, at a time T2, indicates when a temperature of the engine exceeds a predetermined engine temperature. Because the engine speed is above the predetermined engine speed 2000 and the throttle position is above 10 degrees, the diagnostic system 116 has reached the decision block P430 of the control routine 142, and thus triggers a fault code (operation block P440) and records the fault code into memory (operation block P450). Optionally, the control routine 142 can be configured to determined and record the total amount of time, perhaps a portion of the time between T2 and T3, over which the engine temperature exceeds the predetermine engine temperature.

Figure 12:
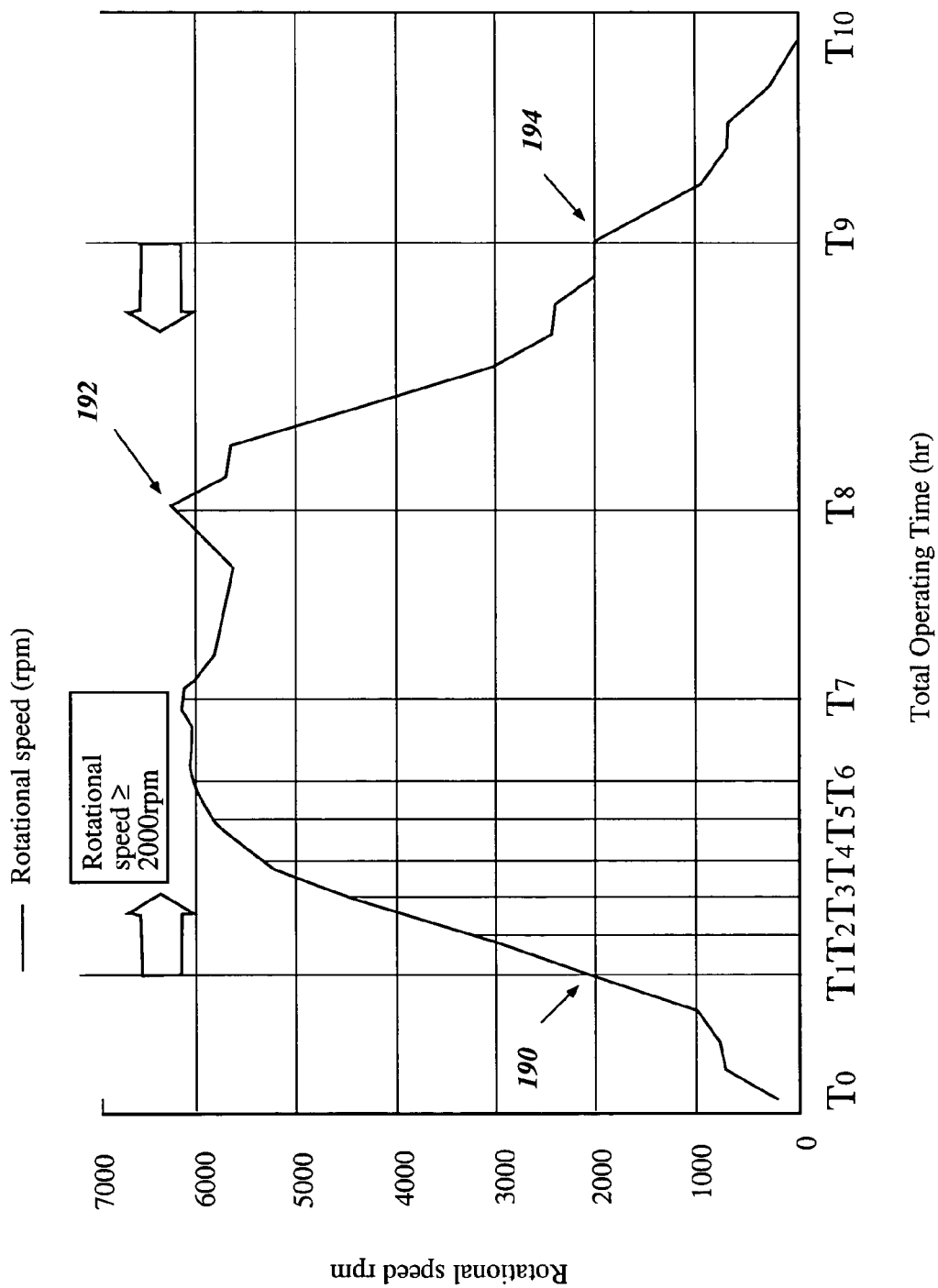
FIG. 12 is a graph illustrating another example of how the ECU of FIG. 1 can diagnose an engine over-rev fault.

FIG. 12 includes a graph of engine speed with reference to total operating time as an illustrative engine operation. With reference also to the control routine 144 of FIG. 5, the engine diagnostic system 116 can be configured to monitor engine speed and to record data indicating each time the engine speed rises above an earlier maximum engine speed. In accordance with the description of the control routine 144 set forth above with reference to FIG. 5, the diagnostic system can be configured to only monitor maximum engine speed after the engine speed has risen above a predetermined engine speed of 2000 RPM (decision block P510). As soon as the engine RPM drops below the predetermined engine speed, the diagnostic system stops monitoring maximum engine speed.

At a time T1 illustrated by reference point 190, the engine speed rises above the predetermined engine speed of 2000 RPM. At this point, the diagnostic system monitors engine speed to determine if the engine rotates at an engine speed higher than any other previous maximum engine speed (decision block P520) illustrated by the time points T2, T3, T4, T5, T6, T7 and T8.

At time T8, illustrated by reference point 192, the engine speed reaches a maximum engine speed which is greater than all previous maximum engine speeds, corresponding to the time points T2, T3, T4, T5, T6, and T7. As the engine speed drops below 2000 RPM illustrated by reference point 194, the diagnostic system 116 stops monitoring engine speed to determine the maximum engine speed. The highest maximum engine speed illustrated by reference point 192 is recorded into memory (operation block P530).

Figure 13:
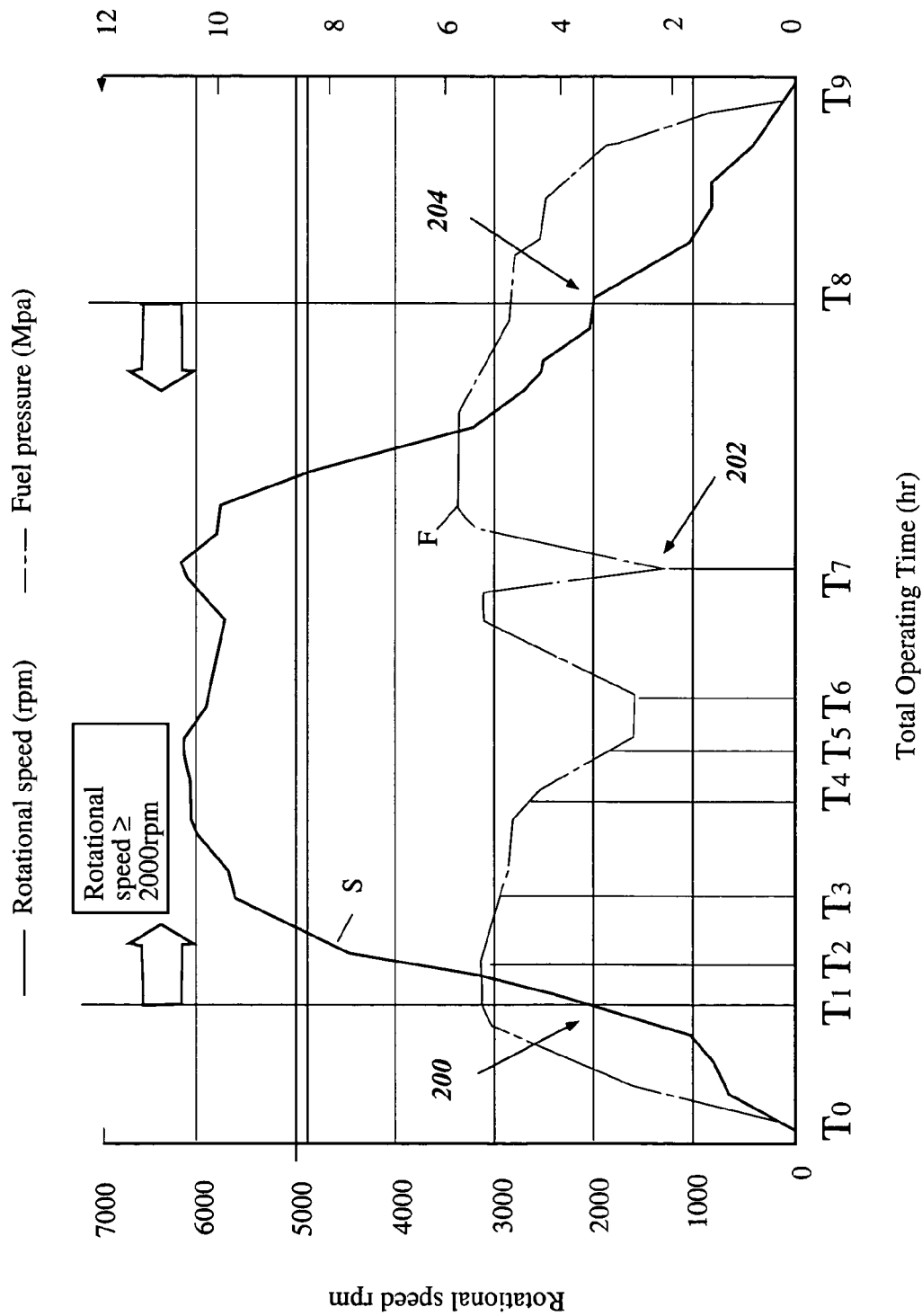
FIG. 13 is a graph illustrating how the ECU of FIG. 1 can use engine speed to begin diagnosing a fuel pressure fault.

FIG. 13 includes a graph illustrating engine speed and fuel pressure with reference to total operating time, during an illustrative operation of an engine, such as the engine 12. The horizontal axis of the graph represents time. The vertical axis of the graph represents engine speed S and fuel pressure F, with engine speed labeled on the left vertical edge of the graph, and fuel pressure labeled on the right side edge of the graph.

With additional reference to the control routine 146 illustrated in FIG. 6, as the engine speed rises above a predetermined engine speed, for example 2000 RPM at a reference point 200, the diagnostic system 116 begins monitoring the fuel pressure (decision block P610).

Time periods T2, T3, T4, T5, T6 and T7 indicate periods where the fuel pressure F has dropped below a previous lowest fuel pressure value. When the fuel pressure F drops below the previous lowest fuel pressure, the diagnostic system 116 detects the new lowest fuel pressure. For example, where the diagnostic system 116 is running the control routine 146, the decision block P620 is used to detect the new lowest fuel pressure value. The diagnostic system 116 can also be configured to record each time a fuel pressure value has dropped below a previous lowest fuel pressure value (operation block P630).

Reference point 202 at time interval T7 illustrates an example of where the fuel pressure has dropped to its lowest value. At this point and time, with an engine speed above 2000 RPM, the diagnostic system records this lowest fuel pressure value into memory.

The reference point 204 illustrates a point and time where the engine RPM drops below the prerequisite engine RPM value of 2000 RPM. At this point the diagnostic system stops monitoring fuel pressure values.

Figure 14:
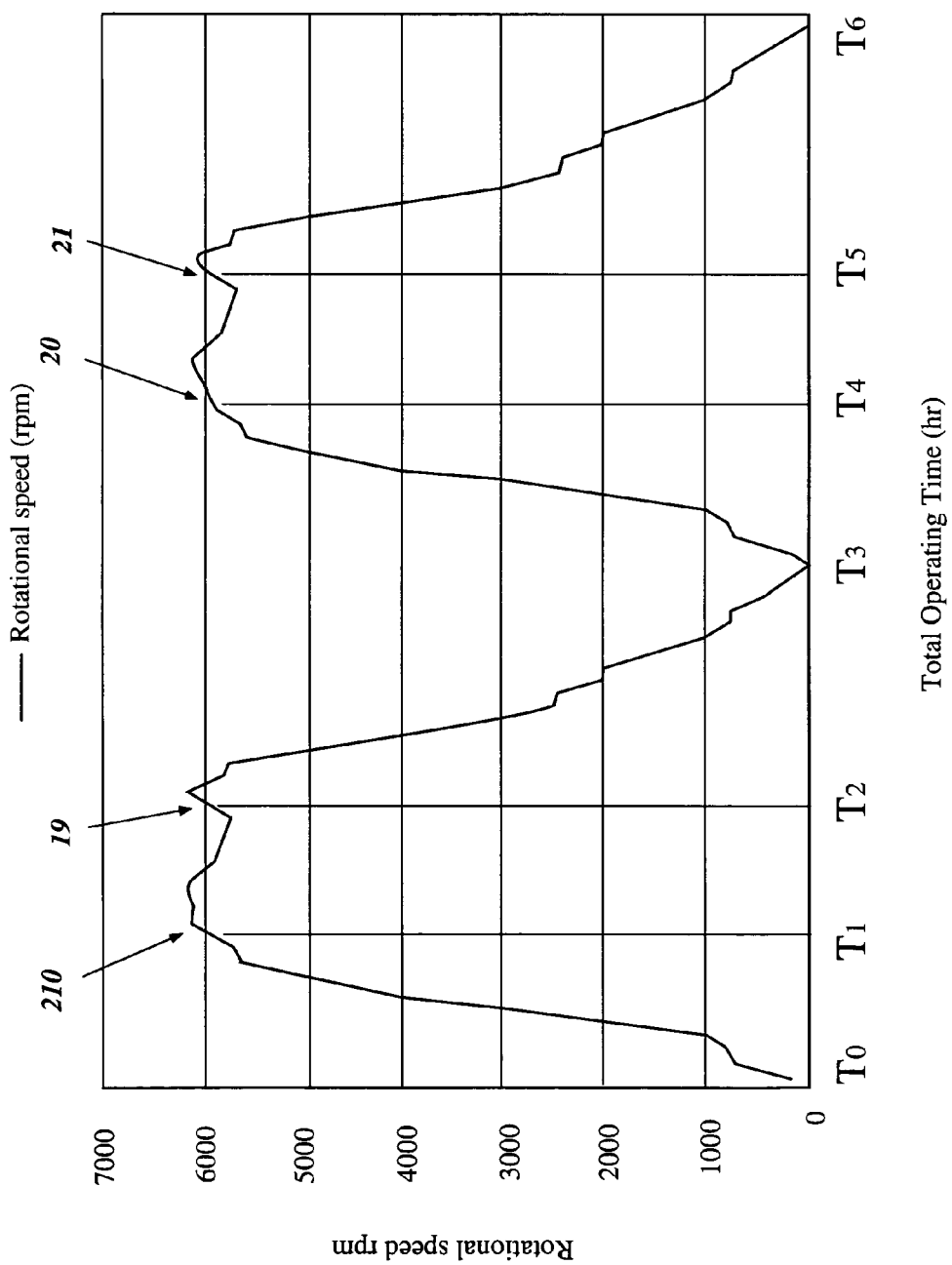
FIG. 14 is a graph illustrating another example of how the ECU of FIG. 1 can diagnose an engine over-rev fault.

FIG. 14 illustrates a graph of engine speed with reference to operating time during an illustrative operation of an engine, such as the engine 12. The engine diagnostic system 116 can be configured to monitor when the engine speed rises above a predetermined maximum engine speed. For example, the engine diagnostic system 116 can be configured to run the control routine 148, described above with reference to FIG. 7.

For example, at a time interval T1, illustrated by reference point 210, the engine speed rises above a predetermined maximum engine speed, for example 6000 RPM. Thus, the diagnostic system 116 detects rise above 6000 RPM (decision block P710). The diagnostic system 116 then records this time value T1 into memory (operation block P720).

At an operating time T2 illustrated by reference point 212, again the diagnostic system records an engine RPM that that is above the maximum predetermined engine RPM of 6000. Similarly, operating times T4 and T5 illustrated by reference points 214 and 216, respectively, are additional points where the engine speed has risen above the predetermined maximum engine RPM of 6000. Each time the engine speed rises above the predetermined maximum engine speed of 6000 RPM, the diagnostic system 116 records these over-rev occurrences along with their time occurrences in memory.

Figure 15:
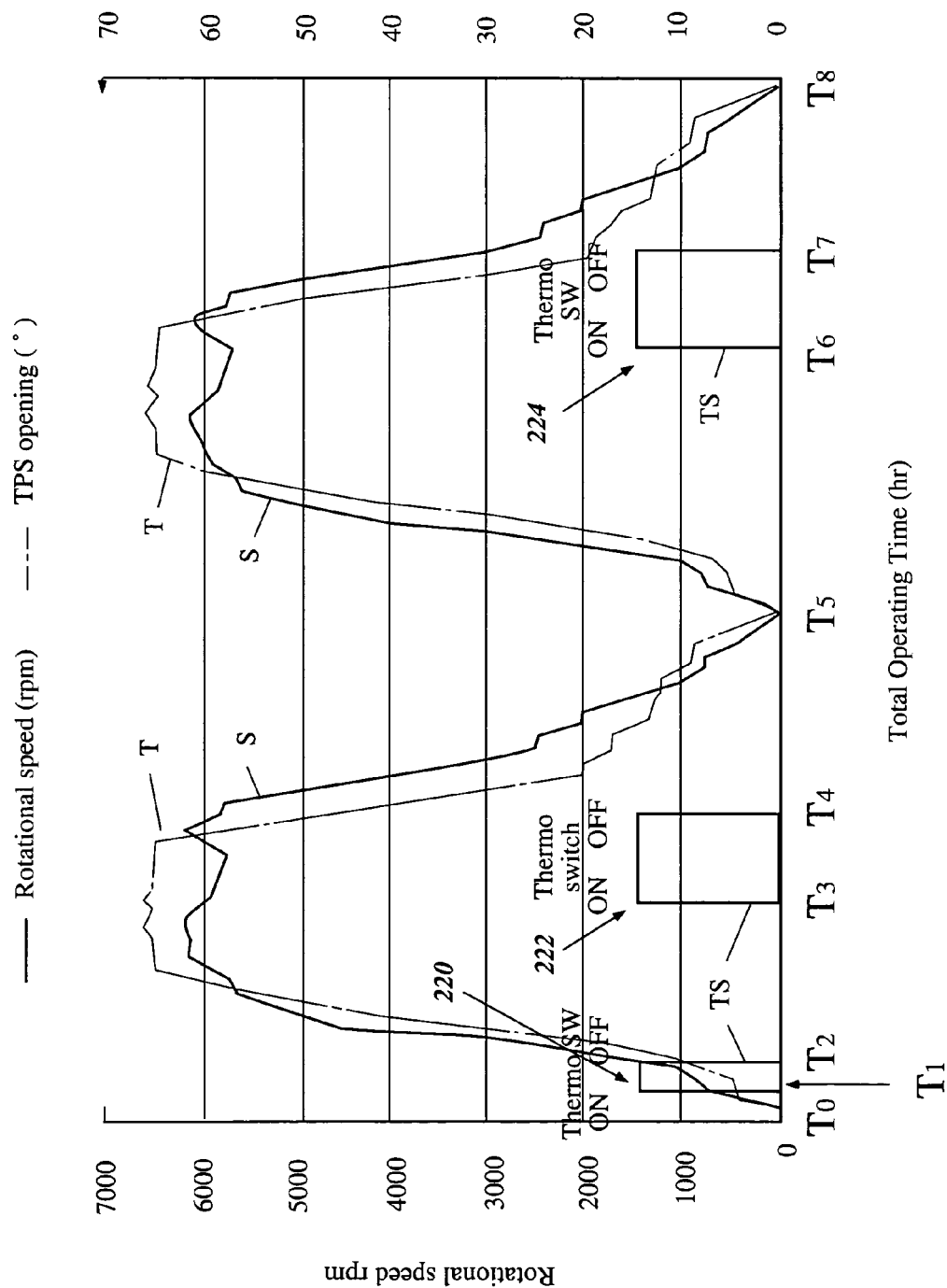
FIG. 15 is a graph illustrating how the ECU of FIG. 1 can diagnose an engine operating temp fault.

FIG. 15 includes a graph illustrating engine speed and throttle position with reference to total operating time. The horizontal axis of the graph represents time. The vertical axis of the graph represents engine speed and throttle position, with engine speed labeled on the left vertical edge of the graph, and throttle position labeled on the right side edge of the graph.

The graph of FIG. 15 also includes three plots, a first plot "S" indicates engine speed, the second plot "T" indicates throttle position, and the third plot "TS" indicates the output signal of a thermal switch having an off value and an on value. The plots S, T, TS illustrate the engine speed, throttle position, and thermo switch output signal during an exemplary operation of an engine, such as the engine 12, so as to provide exemplary reference information when an overheat of the engine is detected The graph illustrated in FIG. 15, in light of the description of the control routine 150 of FIG. 8, illustrates how the diagnostic system 116 can be configured to record into memory the times at which thermal switch 112 is switched on and off. According to the graph between the operating periods T0 and T5, the thermal switch TS has switched on and off twice.

A first occurrence of the thermal switch switching on happens at a time point T1. The thermal switch TS switches off at the time point T2. This accounts for one overheating occurrence illustrated by reference number 220. A second overheating occurrence indicated by reference number 222 occurs when the thermal is switched on at the time point T3 and switches off at the time point T4. Therefore, during the first drive period between T0 and T5, the diagnostic system recorded into memory that the engine overheated twice at points 220 and 222.

A second drive period beginning at total operating time T5 and ending at total operating time T8 also includes a third overheat occurrence 224. The overheat condition begins at total operating time T6 when the thermal switch TS is switched on. The overheat occurrence ends when the thermal switch TS is switched off at total operating time T7. Therefore, during the second drive period between time periods T5 and T8, the engine overheated once.

FIG. 16 is a schematic illustration of a table that the diagnostic system 116 can be configured to display on the computer display 122. The table includes various engine parameters and their corresponding units. The table of FIG. 16 allows for easy determination of various engine parameters.

For example, an engine rotational value can be displayed on the screen along with the proper unit in RPM. Another example can be ignition timing value with the proper unit in degrees. Different background colors and different fonts can differentiate normal or desired engine operating values from fault codes and engine data that indicates a fault or represents an out of range engine parameter values. Other formats representing various engine parameters values and corresponding unit names are also possible. The use of different formats, different colors, and different font allows the users to more easily recognize normal engine parameter values and engine faults allowing improved diagnosis of engine parameter faults.

FIG. 17 is a schematic illustration of another example of a table that the diagnostic system 116 can be configured to display on the computer display 122. The table illustrates that the maximum engine speed and the minimum fuel pressure values along with their corresponding occurrence times can be displayed. The number of over-rev conditions as well as the number of times the engine overheated can also be displayed. The total operating time of the engine can also be measured, recorded and displayed.

Figure 18:
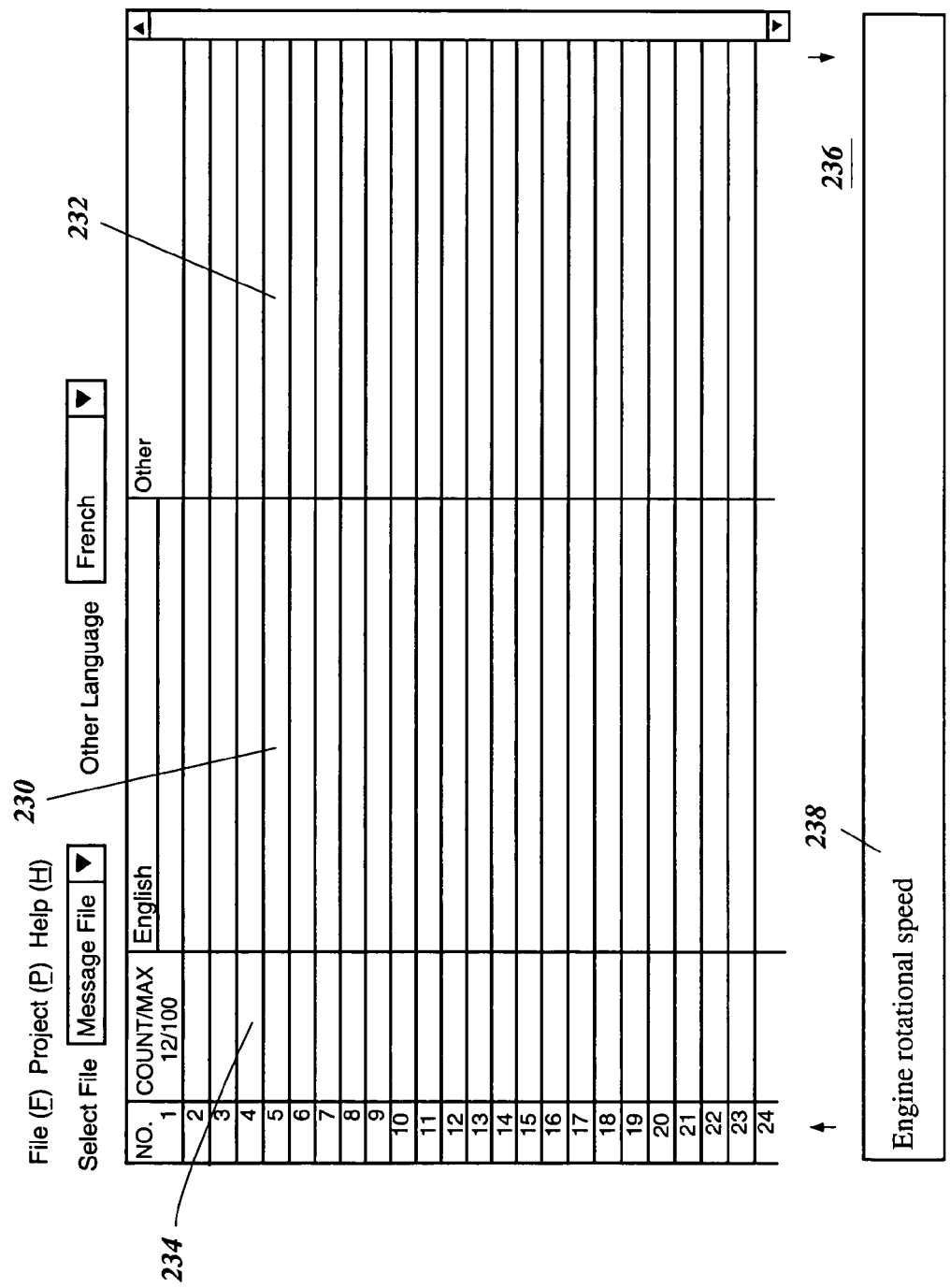
FIG. 18 is a table of data with various menus that can be displayed on the display screen of FIG. 2.

FIG. 18 is a schematic illustration of an editing menu that the diagnostic system 116 can be configured to display on the computer display 122. The editing menu can be configured to display information in various languages. Additionally, the editing menu can be configured to display diagnostic system fault nomenclature options, and a data input section.

Data is displayed in English in column 230 and can be translated into various other languages and displayed in column 232. The diagnostic system 116 can be configured to allow the person editing the software to dictate the number of characters used to name the various engine parameters and faults in column 234. Another column 236 can be configured to display version information corresponding to individual databases used. Display box 238 in the illustrated embodiment, is configured to allow for input of editing values of the database.

It should be noted that for purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A diagnostic system for aiding a technician or engineer in diagnosing engine faults in a mechanism that includes an engine, the diagnostic system comprising an electronic control unit operatively coupled to a memory storage device and to one or more engine sensors, and means for collecting operational data from the one or more engine sensors, comparing the operational data with a predetermined data, comparing the operational data with predetermined data so as to determine if the operational data indicates a fault, storing the collected operational data in the memory storage device, retrieving the operational data from the memory storage device, and displaying the retrieved operational data on a display such that the data indicating a fault is distinguished from operational data that does not indicate a fault.

2. The diagnostic system as set forth in claim 1, wherein the means includes a connector to allow an external system to communicate with the memory storage device, the means further allowing the operational data and the compared data to be displayed on an external display.

3. A diagnostic system for aiding in diagnosing an engine, the diagnostic system comprising an electronic control unit operatively coupled to a data storage device and to one or more engine sensors, the electronic control unit configured to collect operational data from the one or more engine sensors, to compare the collected operational data with predetermined data to determine if the operational data indicates a fault, and to store the collected operational data in the data storage device, an internal system within the electronic control unit with a computer processor being operatively coupled to a memory, an interface device and an external system with a display, the internal system comprising a computer program stored in the memory and configured to retrieve operational data from the data storage device, the computer program further configured to display the operational data collected from the engine sensors through the interface device on the display such that the data indicating a fault is distinguished from operational data that does not indicate a fault.

4. The diagnostic system as set forth in claim 3, wherein the one or more engine sensors comprises an engine speed sensor and a fuel pressure sensor, and wherein the electronic control unit is configured to compare the data from the engine speed sensor to a predetermined engine speed range and to compare the data from the fuel pressure sensor to a predetermined fuel pressure range.

5. The diagnostic system as set forth in claim 3, wherein the electronic control unit is configured to store a number of occurrences that a speed of the engine exceeds a predetermined high engine speed value.

6. The diagnostic system as set forth in claim 3, wherein the electronic control unit is configured to store a number of occurrences that a temperature of the engine exceeds a predetermined high engine speed value.

7. The diagnostic system as set forth in claim 3, wherein the external system is a computer that is operatively connected to the first system and the internal system is configured to transmit at least some of the operational data and the compared data retrieved from the data storage device through the interface device to the computer.

8. The diagnostic system as set forth in claim 3, wherein at least some of the engine sensors are disposed apart from the engine.

9. The diagnostic system as set forth in claim 3, wherein the computer program is configured display at least some of the operational data and compared data in a graphical format.

10. The diagnostic system as set forth in claim 3, in combination with an outboard motor powered by the engine.

11. A method for diagnosing a malfunction in an internal combustion engine which includes an electronic control unit including a memory storage device, the method comprising collecting operational data from one or more engine sensors connected to the electronic control unit, comparing the operational data with predetermined data so as to determine if the operational data indicates a fault, storing the operational data in the memory storage device, retrieving the operational data from the memory storage device with a computer that is operatively connected to the electronic control unit, displaying a chosen set of operational data on a display such that the data indicating a fault is distinguished from the data that does not indicate a fault.

12. A method as in claim 11, wherein collecting comprises collecting data from an engine speed sensor and collecting data from a fuel pressure sensor, and wherein comparing comprises comparing the data from the engine speed sensor to a predetermined engine speed range and comparing the data from the fuel pressure sensor to a predetermined fuel pressure range.

13. A method as in claim 11, wherein storing comprises storing a number of occurrences that a speed of the engine exceeds a predetermined high engine speed value.

14. A method as in claim 11, wherein storing comprises storing a number of occurrences that a temperature of the engine exceeds a predetermined high engine speed value.

15. A method as set forth in claim 11, further comprising attaching a remote display to the electronic control unit to display the operational data and the out of range data and diagnosing engine operation based on the displayed data.

16. A method as in claim 11, wherein collecting operational data involves collecting data from a sensor that is disposed apart from the engine.

17. A method as in claim 11, wherein displaying the chosen set of operational data comprises displaying the chosen set of data in a graphical format on the display.

18. A method as in claim 11, further comprising determining if the engine is operating above a predetermined speed, recording the engine speed above the predetermined engine speed, recording when the engine begins operating above the predetermined speed, and recording the accumulated operating time the engine operated above the predetermined speed.

19. A method as in claim 11, further comprising determining if the engine is operating below a predetermined speed, and if the engine is operating below the predetermined speed, stopping the collection of operational data.

20. A method as in claim 11, wherein comparing comprises determining if the engine is operating with a fuel pressure below a predetermined fuel pressure, and wherein recording the fuel pressure below the predetermined fuel pressure, recording when the engine begins operating with the fuel pressure below the predetermined fuel pressure, and recording the accumulated operating time the engine operated with the fuel pressure below the predetermined fuel pressure.

21. A method as in claim 11, further comprising determining if the engine is operating with a fuel pressure above a predetermined fuel pressure, and if the engine is operating with the fuel pressure above the predetermined fuel pressure, stopping the collection of operational data.

22. A method as in claim 11, wherein comparing comprises determining if the engine is operating above a predetermined operating temperature, and wherein storing comprises storing the operating temperature above the predetermined operating temperature, storing when the engine begins operating above the predetermined operating temperature, and storing the accumulated operating time the engine operated above the predetermined operating temperature.

23. A method as in claim 22, wherein comparing comprises determining if the engine is operating below a predetermined operating temperature, the method additionally comprising stopping the collection of operational data if the engine is operating below a predetermined operating temperature.

24. A method as in claim 11, wherein the engine powers an outboard motor.

* * * * *

UNITED STATES PATENT AND TRADEMARK OFFICE
CERTIFICATE OF CORRECTION

PATENT NO.       : 6,975,936 B2
APPLICATION NO.  : 10/611716
DATED            : December 13, 2005
INVENTOR(S)      : Syu Akurawa et al.

It is certified that error appears in the above-identified patent and that said Letters Patent is hereby corrected as shown below:

Title page, Drawing;

At sheet 2 of 17, Box P340, Figure 3, Line 2, please delete "occurence" and insert therefore, --occurrence--.

At sheet 3 of 17, Box P450, Figure 4, Line 2, please delete "occurence" and insert therefore, --occurrence--.

At sheet 4 of 17, Box P530, Figure 5, Line 2, please delete "occurence" and insert therefore, --occurrence--.

At sheet 5 of 17, Box P630, Figure 6, Line 2, please delete "occurence" and insert therefore, --occurrence--.

At sheet 6 of 17, Box P720, Figure 7, Line 2, please delete "occurence" and insert therefore, --occurrence--.

At sheet 7 of 17, Box P820, Figure 8, Line 2, please delete "occurence" and insert therefore, --occurrence--.

At column 3, Line 43, please delete "cylinder)." And insert therefore, --cylinders).--.

UNITED STATES PATENT AND TRADEMARK OFFICE
CERTIFICATE OF CORRECTION

PATENT NO.       : 6,975,936 B2
APPLICATION NO.  : 10/611716
DATED            : December 13, 2005
INVENTOR(S)      : Syu Akurawa et al.

It is certified that error appears in the above-identified patent and that said Letters Patent is hereby corrected as shown below:

At Column 6, Line 38, please delete "thee" and insert therefore, --the--.

Signed and Sealed this

Twenty-sixth Day of December, 2006

JON W. DUDAS
*Director of the United States Patent and Trademark Office*